United States Patent
Liu et al.

(10) Patent No.: US 11,410,084 B2
(45) Date of Patent: Aug. 9, 2022

(54) METHOD AND APPARATUS FOR TRAINING MACHINE READING COMPREHENSION MODEL, AND STORAGE MEDIUM

(71) Applicant: BEIJING BAIDU NETCOM SCIENCE AND TECHNOLOGY CO., LTD., Beijing (CN)

(72) Inventors: Kai Liu, Beijing (CN); Qiaoqiao She, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 292 days.

(21) Appl. No.: 16/915,885

(22) Filed: Jun. 29, 2020

(65) Prior Publication Data
US 2021/0201196 A1   Jul. 1, 2021

(30) Foreign Application Priority Data
Dec. 27, 2019 (CN) .......................... 201911376949.0

(51) Int. Cl.
G06N 20/00 (2019.01)
G06F 40/242 (2020.01)
G06F 17/16 (2006.01)

(52) U.S. Cl.
CPC ............. *G06N 20/00* (2019.01); *G06F 17/16* (2013.01); *G06F 40/242* (2020.01)

(58) Field of Classification Search
None
See application file for complete search history.

(56) References Cited

U.S. PATENT DOCUMENTS

| | | | |
|---|---|---|---|
| 11,151,478 B2* | 10/2021 | Jha | G06F 40/30 |
| 2007/0048699 A1* | 3/2007 | MacGregor | G09B 17/006 |
| | | | 434/178 |
| 2020/0034750 A1* | 1/2020 | Ritter | G06N 20/00 |
| 2020/0320429 A1* | 10/2020 | Jha | G06N 20/00 |

(Continued)

FOREIGN PATENT DOCUMENTS

| | | | |
|---|---|---|---|
| CN | 104966097 A | 10/2015 | |
| CN | 108959396 A | 12/2018 | |

(Continued)

OTHER PUBLICATIONS

Belinkov et al. "Synthetic and Natural Noise Both Break Neural Machine Translation", Published as a conference paper at ICLR 2018.*

(Continued)

*Primary Examiner* — Maikhanh Nguyen
(74) *Attorney, Agent, or Firm* — Lathrop GPM LLP

(57) ABSTRACT

Embodiments of the present disclosure provide a method and an apparatus for training a machine reading comprehension model, and a storage medium. The method includes: training an initial model to generate an intermediate model based on sample data; extracting samples to be processed from the sample data according to a first preset rule; generating a noise text according to a preset noise generation method; adding the noise text to each of the samples to be processed respectively to generate noise samples; and performing correction training on the intermediate model based on the noise samples to generate the machine reading comprehension model.

11 Claims, 4 Drawing Sheets

(56) References Cited

U.S. PATENT DOCUMENTS

2021/0166136 A1\* 6/2021 Li ........................... G06N 3/084
2022/0148135 A1\* 5/2022 Isik ...................... G06N 3/0454

FOREIGN PATENT DOCUMENTS

| CN | 109033478 A | 12/2018 |
|---|---|---|
| CN | 109741406 A | 5/2019 |
| CN | 109816111 A | 5/2019 |
| CN | 110096698 A | 8/2019 |
| CN | 110516059 A | 11/2019 |
| JP | 2018081298 A | 5/2018 |
| WO | WO 2019195042 A1 | 10/2019 |

OTHER PUBLICATIONS

Sperber et al. "Toward Robust Neural Machine Translation for Noisy Input Sequences", Proceedings of the 14th International Workshop on Spoken Language Translation Tokyo, Japan, Dec. 2017, pp. 90-96.\*
Gorp et al. "Learning Neural Networks with Noisy Inputs Using the Errors-in Variable Approach", IEEE, Mar. 2000, pp. 402-414.\*
Japanese Patent Application No. 2020-204323, Office Action dated Nov. 2, 2021, 2 pages.
Japanese Patent Application No. 2020-204323, English translation of Office Action dated Nov. 2, 2021, 2 pages.
Sawayama A. et al. "Named Entity Recognition Improvement through Semi-supervised Data Construction" IPSJ Technical Report, vol. 2016-NL-226 No. 9, May 2016; 6 pages.
Yamamoto, H. et al. "Neural reading comprehension \*\* in know how question-answering" Proceeding of the Twenty-fifth Annual Meeting of the Association for Natural Language Processing, Mar. 4, 2019, pp. 695-698.
Yamamoto, H. et al. English translation of "Neural reading comprehension \*\* in know how question-answering" Proceeding of the Twenty-fifth Annual Meeting of the Association for Natural Language Processing, Mar. 4, 2019, 5 pages.
Chinese Patent Application No. 201911376949.0, Second Office Action dated Nov. 16, 2020, 7 pages.
Chinese Patent Application No. 201911376949.0, English translation of Second Office Action dated Nov. 16, 2020, 12 pages.
Chinese Patent Application No. 201911376949.0, First Office Action dated Aug. 11, 2020, 7 pages.
Chinese Patent Application No. 201911376949.0, English translation of First Office Action dated Aug. 11, 2020, 8 pages.

\* cited by examiner obtaining the weight vectors corresponding to the elements in the noise vectors from the preset weight matrix — 401 according to a position of the largest weight value of each weight vector, extracting a character at the position from a preset dictionary as a character at a corresponding position in the noise text — 402

METHOD AND APPARATUS FOR TRAINING MACHINE READING COMPREHENSION MODEL, AND STORAGE MEDIUM

CROSS-REFERENCE TO RELATED APPLICATION

The present application is based upon and claims priority to Chinese Patent Application No. 201911376949.0, filed on Dec. 27, 2019, the entire contents of which are incorporated herein by reference.

TECHNICAL FIELD

The present disclosure relates to a field of computer technologies, specifically to a field of Natural Language Processing (NLP) technologies, and more particularly, to a method and an apparatus for training a machine reading comprehension model, and a storage medium.

BACKGROUND

In a noiseless environment, a machine reading comprehension model could correctly find an answer to a question in a given paragraph. Currently, in order to improve the robustness of the machine reading comprehension model, the capability of the machine reading comprehension model to resist noise is generally enhanced by adding more data from other sources to the model as input, such as adding a strong language model as input.

However, in this way, the reading comprehension model needs to be modified, which increases the difficulty of the reading comprehension model and the complexity of training.

SUMMARY

The present disclosure provides a method and an apparatus for training a machine reading comprehension model, and a storage medium.

Embodiments of the present disclosure provide a method for training a machine reading comprehension model. The method includes: training an initial model to generate an intermediate model based on sample data; extracting samples to be processed from the sample data according to a first preset rule; generating a noise text according to a preset noise generation method; adding the noise text to each of the samples to be processed respectively to generate noise samples; and performing correction training on the intermediate model based on the noise samples to generate the machine reading comprehension model.

Embodiments of the present disclosure provide an apparatus for training a machine reading comprehension model. The apparatus includes: one or more processors; a memory storing instructions executable by the one or more processors; in which the one or more processors are configured to: train an initial model to generate an intermediate model based on sample data; extract samples to be processed from the sample data according to a first preset rule; generate a noise text according to a preset noise generation method; add the noise text to each of the samples to be processed respectively to generate noise samples; and perform correction training on the intermediate model based on the noise samples to generate the machine reading comprehension model.

Embodiments of the present disclosure provide a non-transitory computer-readable storage medium storing computer instructions, in which when the computer instructions are executed, the computer is caused to implement a method for training the machine reading comprehension model. The method includes: training an initial model to generate an intermediate model based on sample data; extracting samples to be processed from the sample data according to a first preset rule; generating a noise text according to a preset noise generation method; adding the noise text to each of the samples to be processed respectively to generate noise samples; and performing correction training on the intermediate model based on the noise samples to generate the machine reading comprehension model.

BRIEF DESCRIPTION OF THE DRAWINGS

The accompanying drawings are used to better understand the solution, and do not constitute a limitation on the disclosure, in which.

DETAILED DESCRIPTION

The following describes the exemplary embodiments of the present disclosure with reference to the accompanying drawings, which includes various details of the embodiments of the present disclosure to facilitate understanding, which shall be considered merely exemplary. Therefore, those of ordinary skill in the art should recognize that various changes and modifications can be made to the embodiments described herein without departing from the scope and spirit of the present disclosure. For clarity and conciseness, descriptions of well-known functions and structures are omitted in the following description.

A method and an apparatus for training a machine reading comprehension model, an electronic device and a storage medium according to embodiments of the present disclosure are described below with reference to the accompanying drawings.

In the embodiments of the present disclosure, in order to solve the technical problem of increasing the difficulty of the machine reading comprehension model and the complexity of training by adding more data from other sources to the model as input to improve the anti-noise capability of the model in the related art, a method for training a machine reading comprehension model is proposed.

In the method for training a machine reading comprehension model according to an embodiment of the present disclosure, by automatically generating a noise text during the machine reading comprehension model training process, a noise sample is obtained from the noise text, and the noise sample is used to modify and train the intermediate model to obtain a machine reading comprehension model. In order to improve the anti-noise ability of the machine reading comprehension model and the robustness of the model, there is no need to modify the model, and no manual participation is required, and the cost is low.

Figure 1:
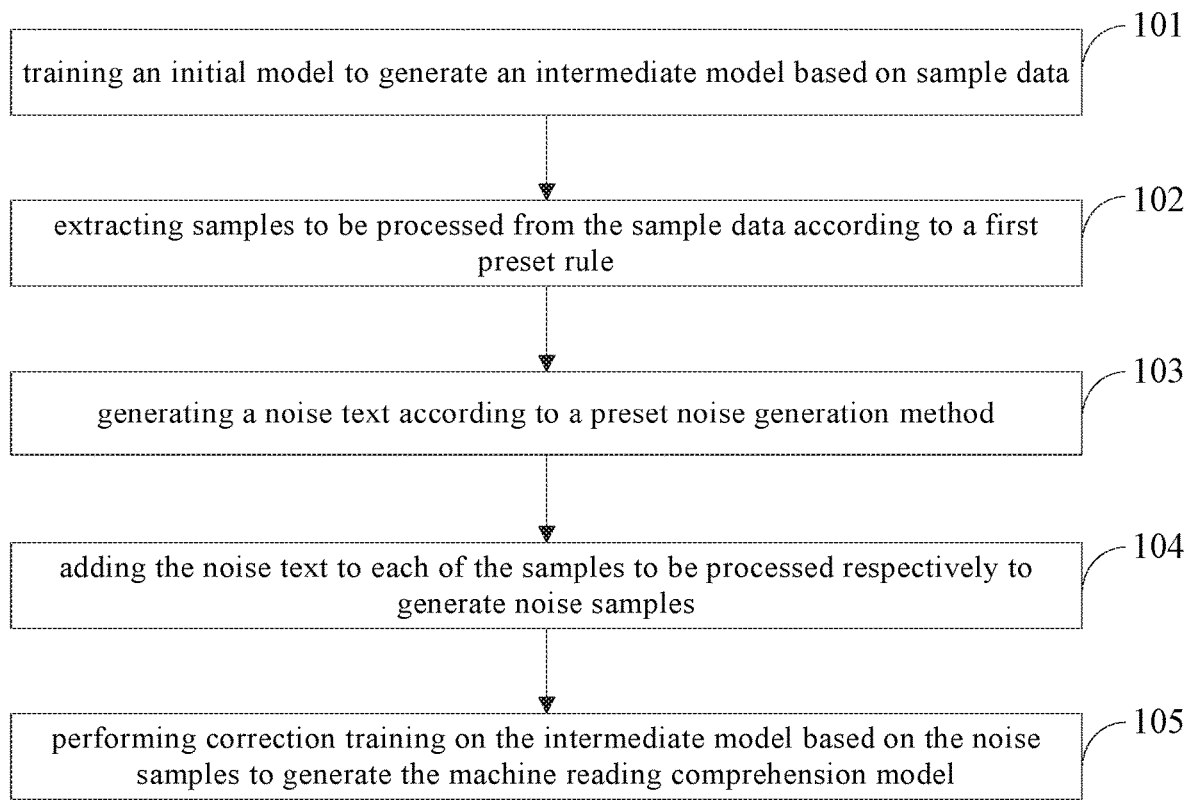
FIG. 1 is a flowchart of a method for training a machine reading comprehension model according to an embodiment of the present disclosure.

FIG. 1 is a flowchart of a method for training a machine reading comprehension model according to an embodiment of the present disclosure.

The method for training the machine reading comprehension model according to the embodiment of the present disclosure may be executed by the apparatus for training the machine reading comprehension model according to the embodiments of the present disclosure. The apparatus may be configured in an electronic device to automatically generate the noise text during the model training process. Based on the noise samples obtained from the noise text, the model is trained to improve the robustness of the machine reading comprehension model.

As illustrated in FIG. 1, the method for training the machine reading comprehension model includes the following steps.

At step 101, an initial model is trained to generate an intermediate model based on sample data.

In this embodiment, the sample data contains a large number of samples, and each sample is represented as {q, p, $s_g$}, in which q refers to a question, p refers to a paragraph, and $s_g$ refers to position information of the question q in the paragraph p. Generally, the answer in p is expressed as a continuous text, then the answer is generally expressed as an continuous interval $s_g$=[start, end], which represents the information of the continuous text, where start represents the start position of the continuous interval, and end represents the end position of the continuous interval.

In detail, all samples in the obtained sample data may be used to train the initial model, and when the sample data reaches an optimal effect, the training is stopped and the intermediate model is obtained. In specific training, algorithms include but not limited to, neural network back propagation algorithm, and stochastic gradient descent method, may be used to adjust model parameters based on sample data.

At step 102, samples to be processed are extracted from the sample data according to a first preset rule.

In order to improve the anti-noise capability of the model, in this embodiment, a certain amount of samples may be extracted from the sample data as samples to be processed.

If the number of the sample data is N, M samples may be extracted as the sample to be processed during the extraction, where M is smaller than N.

During extraction, some samples may be randomly extracted from the sample data as samples to be processed. Alternatively, in order to increase the intensity of noise, a certain number of samples with different labeled positions of answers may be extracted as samples to be processed according to the labeled positions of answers corresponding to the respective samples in the sample data. That is, samples with different positions of answers in the paragraph may be taken as samples to be processed.

In practical applications, 5% of the sample data may be extracted as samples to be processed. Certainly, the number of the samples to be processed may be determined as needed.

At step 103, a noise text is generated according to a preset noise generation method.

In this embodiment, the noise text may be generated according to the preset noise generation method. The noise text makes the intermediate model fail to correctly predict the correct position $s_g$ of the answer when the noise text exists in p.

When generating the noise text, a noise text may be generated for each sample to be processed, or a noise text may be generated for all samples to be processed, that is, all samples to be processed have the same noise text, thus, the training speed can be improved.

At step 104, the noise text is added to the samples to be processed respectively to generate noise samples.

After generating the noise text, the noise text is added to each sample to be processed respectively, and the noise samples are obtained according to the added sample to be processed. If a corresponding noise sample is generated for each sample to be processed, the noise sample is added to the corresponding sample to be processed, and if all samples to be processed have one noise sample, the noise sample is added to the respective samples to be processed.

After adding the noise text to the sample to be processed, the sample to be processed after the noise text is added is obtained, and the position of the answer is labeled in the sample to be processed after the noise text is added according to the position where the noise text is added and the labeled answer position in the sample to be processed, and then noise samples are obtained. The number of the noise samples may be the same as the number of the samples to be processed, or may be greater than the number of the samples to be processed.

For example, the sample to be processed is {q, p, $s_g$}, and the paragraph p' is obtained after adding a noise text A into the paragraph p. The noise sample is {q, p', $s_g'$}, where $s_g'$ is an interval after the original answer $s_g$ is offset by inserting the noise text A. That is, the original answer is $s_g$, after the noise text A is added into the paragraph, the answer may be offset, which is represented as $S_g'$.

In this embodiment, the noise text may be inserted at the beginning, the middle, or the end of the paragraph in the sample to be processed. However, it is noted that the noise text cannot be inserted into the interval of the answer, that is, it cannot affect the answer.

For example, the sample to be processed is {q, p, $s_g$}, $s_g$=[start, end], where start represents the start position of the answer, end represents the end position of the answer, and the length of the noise text A is h, then the insertion position of the noise text should be equal to or less than start-h, or greater than or equal to end. For example, if the answer is the $15^{th}$-$20^{th}$ characters in the paragraph and the length of the noise text is 5, then the noise text should be inserted ahead of the $10^{th}$ character or behind the $20^{th}$ character to ensure that the noise text is not inserted into the answer.

At step 105, correction training is performed on the intermediate model based on the noise samples to generate the machine reading comprehension model.

When training the intermediate model, it is determined whether correction operation is required according to the matching degree between the predicted position of the answer output by the intermediate model and the labeled position of the answer in the noise sample. If the matching degree is less than the preset threshold, correction operation is required, and the noise sample is used to correct the intermediate model. Alternatively, a wrong labeled position may be preset, and then according to the matching degree between the predicted position of the answer output by the intermediate model and the wrong labeled position, if the matching degree is smaller than the preset threshold, no correction operation is required.

Optionally, when the number of training times reaches a specified number, or when the number of noise samples used for training reaches a certain number, the correction training finishes. Specific conditions of finishing the correction training can be set as required.

In the method for training a machine reading comprehension model according to an embodiment of the present disclosure, by automatically generating a noise text during the process of training the machine reading comprehension model, a noise sample is obtained from the noise text, and the noise sample is used to modify and train the intermediate model to obtain a machine reading comprehension model. In order to improve the anti-noise ability of the machine reading comprehension model and the robustness of the model, there is no need to modify the model, and no manual participation is required, and the cost is low.

Figure 2:
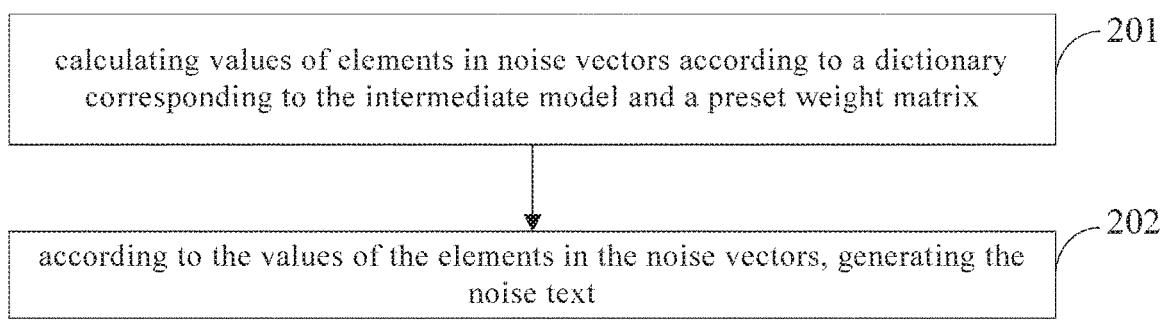
FIG. 2 is a flowchart of a method for training a machine reading comprehension model according to another embodiment of the present disclosure.

In an embodiment of the present disclosure, the noise text is generated by the method shown in FIG. 2. FIG. 2 is a flowchart of a method for training a machine reading comprehension model according to another embodiment of the present disclosure.

As illustrated in FIG. 2, generating the noise text according to the preset noise generating method includes the following steps.

At step 201, values of elements in a noise vector are calculated according to a dictionary corresponding to the intermediate model and a preset weight matrix.

In this embodiment, the length of the noise vector may be identical to the preset number of rows of the weight matrix. In detail, the value of each element in the noise vector may be calculated according to the element value in the preset weight matrix and the vector corresponding to the character in the dictionary.

As an implementation manner, it is assumed that the preset weight matrix includes L×K elements, that is, the weight matrix is a matrix of L rows and K columns. When calculating the value of each element in the noise vector, the value of the $i^{th}$ element in the noise vector may be determined according to values of elements in the $i^{th}$ row in the preset weight matrix and vector values of the first K characters in the dictionary corresponding to the intermediate model.

The specific formula is represented by:

$$e'_i = \sum_{j=0}^{K} w_{ij} v_j,$$

where $e_i'$ represents the value of the $i^{th}$ element in the noise vector e', $v_j$ represents the vector value corresponding to the $j^{th}$ character in the dictionary, and $w_{ij}$ represents the weight of the value $e_i'$ of the $i^{th}$ element in the noise vector on the $j^{th}$ character. It can be seen that the value of the elements in the $i^{th}$ row in the preset weight matrix $W_{L \times K}$ is the weight of the value of the $i^{th}$ element in the noise vector on the first K characters in the dictionary.

At step 202, according to the values of the elements in the noise vector, the noise text is generated.

After obtaining the value of each element in the noise vector, according to the values of the elements, the noise vector is obtained. After that, the noise vector can be decoded to obtain the corresponding noise text.

In the embodiment of the present disclosure, the value of each element in the noise vector is calculated according to the dictionary corresponding to the intermediate model and the preset weight matrix, and the noise text is generated according to the value of each element in the noise vector.

In practical applications, adding the noise vector or the noise text obtained in the above manner to the samples to be processed cannot achieve the purpose that the intermediate model correctly predicts the position of the correct answer when the noise text exists in the paragraph, and cannot achieve the purpose of enhancing the anti-noise capability of the machine reading comprehension model. On the basis, in an embodiment of the present disclosure, after acquiring the noise vector, it is determined whether the noise vector meets the requirements, and if the requirements are not met, the noise vector is regenerated. The following is described in combination with FIG. 3, FIG. 3 is a flowchart of a method for training a machine reading comprehension model according to yet another embodiment of the present disclosure.

Figure 3:
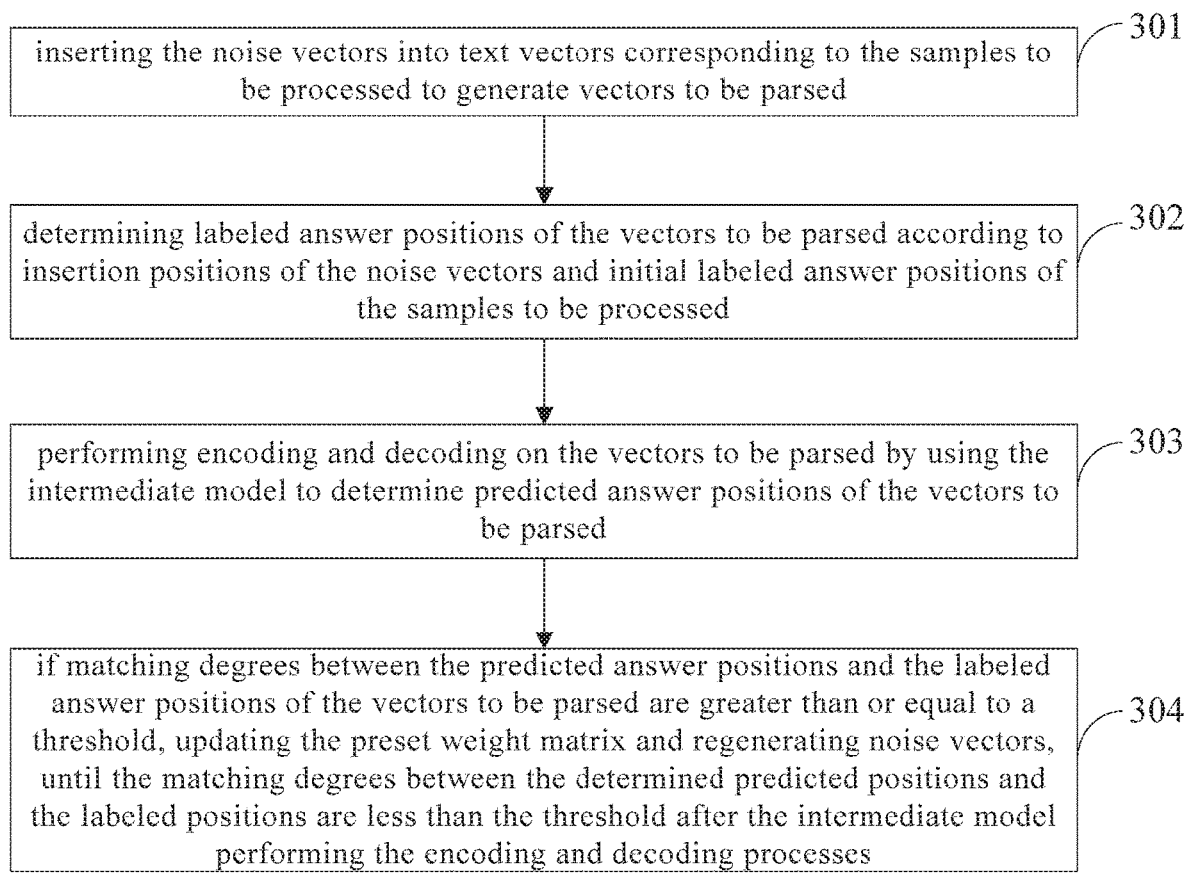
FIG. 3 is a flowchart of a method for training a machine reading comprehension model according to yet another embodiment of the present disclosure.

As illustrated in FIG. 3, after calculating the value of each element in the noise vector, the method further includes the following steps.

At step 301, the noise vector is inserted into text vectors corresponding to the samples to be processed to generate vectors to be parsed.

After calculating the value of each element in the noise vector, the noise vector is obtained, and then the noise vector is inserted into the text vector corresponding to the sample to be processed, and the vector obtained after the insertion is called the vectors to be parsed.

For example, if the paragraph in the sample to be processed is p, and the paragraph includes n characters, then the text vector $e_p$ corresponding to the paragraph can be expressed as $e_p = e_{p1} e_{p2} e_{p3} L e_{pn}$, in which $e_{p1}$ represents the vector corresponding to the first character in the paragraph, and the noise text vector $e' = [e_1', e_2', L, e_k']$ is inserted to the text vector $e_p$ to obtain the vectors to be parsed $e_p' = e_{p1} e_{p2} e_{p3} L e_{pk} e' e_{pk+1} L e_{pn} = e_{p1} e_{p2} e_{p3} L e_{pk} \oplus e_1' e_2' L e_k' \oplus e_{pk+1} L e_{pn}$. k represents the insertion position of the noise vector $e' = [e_1', e_2', L, e_k']$ in $e_p$.

At step 302, labeled answer positions of the vectors to be parsed are determined according to insertion position of the noise vector and initial labeled answer positions of the samples to be processed.

After obtaining the vectors to be parsed, according to the initial labeled position of the answers in the sample to be processed, the labeled positions of the answers in the text vector corresponding to the sample to be processed are determined. According to the insertion position of the noise vector and the labeled positions of the answers in the text vector corresponding to the sample to be processed, the labeled positions of the answers in the vector to be parsed, and the positions of the vectors corresponding to the answers in the vector to be parsed are determined.

At step 303, encoding and decoding are performed on the vectors to be parsed by using the intermediate model to determine predicted answer positions of the vectors to be parsed.

After determining the labeled positions of the answers in the vectors to be parsed, the vectors to be parsed and the vector corresponding to the question are input to the intermediate model, and the positions of the answers are predicted by the intermediate model. In detail, the intermediate model is used to encode and decode the vectors to be parsed and the vector corresponding to the question, and the model outputs the predicted positions of the answers in the vectors to be parsed.

At step 304, if matching degrees between the predicted answer positions and the labeled answer positions of the vectors to be parsed are greater than or equal to a threshold, the preset weight matrix is updated and the noise vector is regenerated until the matching degrees between the determined predicted positions and the labeled positions are less than the threshold after the intermediate model performing the encoding and decoding processes.

After obtaining the predicted positions of the answers, the matching degrees between the predicted positions of the answers in the vectors to be parsed and the labeled positions are calculated. In detail, the existing method for calculating matching degrees can be used. If the matching degrees between the predicted positions of the answers in the vectors to be parsed and the labeled positions are greater than or equal to the threshold value, it means that the noise vector has little effect on the model's anti-noise capability, then the preset weight matrix is updated according to the updated weight matrix and dictionary to regenerate the noise vector.

Afterwards, for the regenerated noise vector, the above steps 301-304 are repeated. If the matching degrees between the predicted positions of the answers and the labeled positions are still greater than or equal to the threshold, continue to update the weight matrix and regenerate the noise vector until the matching degrees between the determined predicted positions and the labeled positions are less than the threshold after the intermediate model performing the encoding and decoding processes. At this time, the resulting noise vector is used to generate noise text.

When updating the weight matrix, the preset weight matrix is adjusted through the initial model. In detail, the sample data may be used to train the initial model in reverse, and the weight matrix obtained when training reaches a certain level is used as the updated weight matrix.

As another way to determine the noise vector, one or more invalid answers may be given to the initial labeled positions of in the vectors to be parsed, and then the intermediate training model is used to obtain the predicted positions of the invalid answers. If the matching degrees between the predicted positions of the invalid answers and the labeled positions are less than the threshold, the preset weight matrix is updated, and the noise vector is regenerated until the matching degrees between the determined predicted positions of the determined invalid answers and the labeled positions are greater than or equal to the threshold after the intermediate model performing the encoding and decoding processes. At this time, the resulting noise vector is used to generate noise text.

When updating the weight matrix, the initial training model may be used to adjust the preset weights. In detail, the initial model can be trained using the sample data. The weight matrix obtained when training reaches a certain level is used as the updated weight matrix.

In the embodiments of the present disclosure, after calculating the value of each element in the noise vector, through the intermediate training model and the text vector corresponding to the sample to be processed inserted in the noise vector, it is determined whether the matching degrees between the predicted positions of answers of the intermediate model and the labeled positions of the answers meet the threshold requirements, if the matching degrees are greater than or equal to the threshold, that is, the requirements are not met, the weight matrix is updated, and the noise vector is regenerated until the matching degrees between the predicted positions of the answers of the intermediate training model and the labeled positions of the answers are less than the threshold. Thus, the noise vector that can improve the model's ability to resist noise can be obtained.

Figures 4, 5:
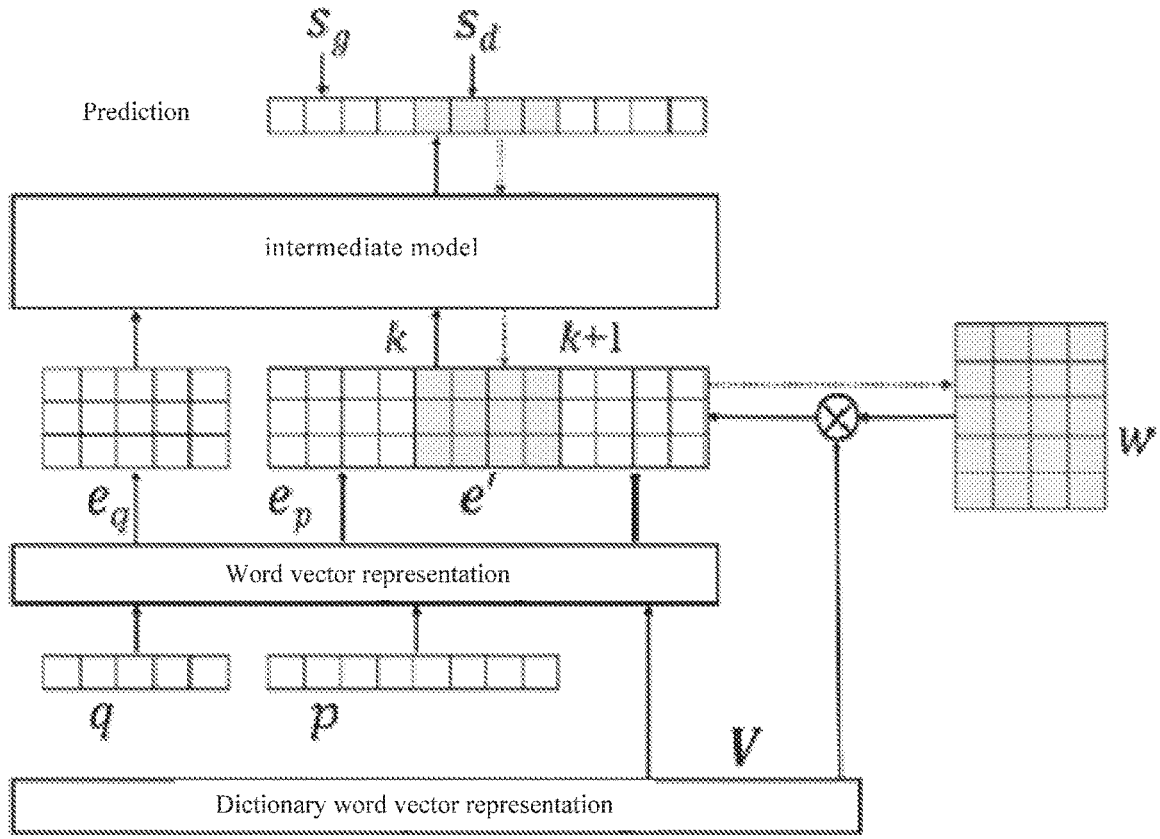
FIG. 4 is a schematic diagram of updating a weight matrix according to an embodiment of the present disclosure.
FIG. 5 is a flowchart of a method for training a machine reading comprehension model according to another embodiment of the present disclosure.

The method of updating the weight matrix described above is described below with reference to FIG. 4. FIG. 4 is a schematic diagram of updating a weight matrix according to an embodiment of the present disclosure.

In FIG. 4, by vectorising the question q, the paragraph p where the answer is located and the dictionary, the corresponding vectors $e_q$, $e_p$ and V are obtained respectively. The noise vector e' is obtained by using the preset weight matrix w and the vector V, and then the noise vector e' is inserted at the position k of the text vectors $e_p$ and that is, the noise vector is inserted between k and k+1. Then, the position of the answer may be predicted by inputting the vector $e_q$ and $e_p$ inserted with the noise vector into the intermediate model. $s_g$ indicates the labeled positions of the correct answers, and $s_d$ indicates the labeled positions of the given invalid answers.

Based on the given correct answer $s_g$, if the matching degree between the predicted answer position and the correct answer position is greater than or equal to the threshold, the preset weight matrix is updated and the noise vector is regenerated until the matching degrees between the predicted positions of the answers and the correct positions of the answers are smaller than the threshold. Or, based on the labeled position $s_d$ of the invalid answer, it is determined whether the matching degree between the predicted position of the answer and the invalid answer position is less than the threshold, if yes, the weight matrix is updated and the noise vector is regenerated until the matching degree between the predicted position of the answer and the position of the invalid answer is greater than or equal to than the threshold.

In order to ensure the correctness of the answer, in an embodiment of the present disclosure, before inserting the noise vector into the text vector corresponding to the sample to be processed, the insertion position of the noise vector is determined first.

In detail, according to labeled answer positions $[S_S, S_e]$ of the text vectors corresponding to the samples to be processed, it is determined that an insertion position $S_i$ of the noise vector is less than or equal to $S_S$-x, or $S_i$ is greater than or equal to $S_e$, wherein $S_S$ is an answer start position, $S_e$ is an answer end position, and x is a length of the noise vector.

$S_S$ may be a start row number of the vector corresponding to the answer in the text vector, and $S_e$ is an end row number, that is, the vectors of elements between $S_S$ and Se are the vectors corresponding to the answer.

Therefore, when inserting the noise vector, the noise vector is inserted before or after the vector corresponding to the answer to avoid inserting into the vector corresponding to the answer, which may affect the answer to the question.

In an embodiment of the present disclosure, when generating the noise text according to the values of the elements in the noise vector, the noise text may be generated according to the manner shown in FIG. 5. FIG. 5 is a flowchart of a method for training a machine reading comprehension model according to another embodiment of the present disclosure.

As illustrated in FIG. 5, generating the noise text according to the values of the elements in the noise vector includes the following steps.

At step 401, the weight vectors corresponding to the elements in the noise vector are obtained from the preset weight matrix.

In this embodiment, the elements corresponding to each row in the preset weight matrix may be used as the weight vectors corresponding to the elements in the noise vector.

For example, if the weight matrix is an L×K matrix, for the first row to the $L^{th}$ row in the weight matrix, the vector formed by elements of each row may be used as the weight vector corresponding to each element in the noise vector. For example, the weight vector corresponding to the first element of the noise vector is a vector composed of the elements of the first row in the weight matrix.

At step 402, according to a position of the largest weight value of each weight vector, a character at the position from a preset dictionary is determined as a character at a corresponding position in the noise text.

Suppose that the weight matrix is an L×K matrix, and the noise vector contains L elements. The weight vector corresponding to the $i^{th}$ element in the noise vector may be expressed as $[W_{i1}, W_{i2}, W_{i3}, \ldots, W_{iL}]$. If the value of $W_{ij}$ is the largest, then the $j^{th}$ character in the dictionary is determined as the $i^{th}$ character in the noise text.

For example, in the weight vector corresponding to the second element in the noise vector, $W_{24}$ has the largest value, the fourth character in the dictionary may be used as the second character in the noise text. As another example, in the weight vector corresponding to the fourth element in the noise vector, $W_{46}$ has the largest value, the sixth character in the dictionary may be taken as the fourth character in the noise text.

Thus, when determining each element in the noise vector, the character taken from the corresponding position in the dictionary can be taken as the character at the corresponding position according to the position of the maximum value in the weight vector corresponding to the element, to obtain the noise text.

In an embodiment of the present disclosure, when generating the noise text according to the values of each element in the noise vector, the noise text may also be generated in the following manner.

In detail, for each element of the noise vector, the matching degree between the value of the element and the vector value corresponding to each character in the dictionary corresponding to the intermediate model may be calculated, and the character with the greatest matching degree is taken as the character corresponding to the position of the element.

That is, the value of the vector corresponding to the character is selected from the dictionary corresponding to the intermediate model, and the character with the greatest matching value with the value of the $j^{th}$ element in the noise vector is taken as the character at the $j^{th}$ position in the noise text. Thus, according to the value of each element in the noise vector and the value of the vector corresponding to each character in the dictionary, the characters corresponding to each element are determined, and then the noise text can be obtained.

Figure 6:
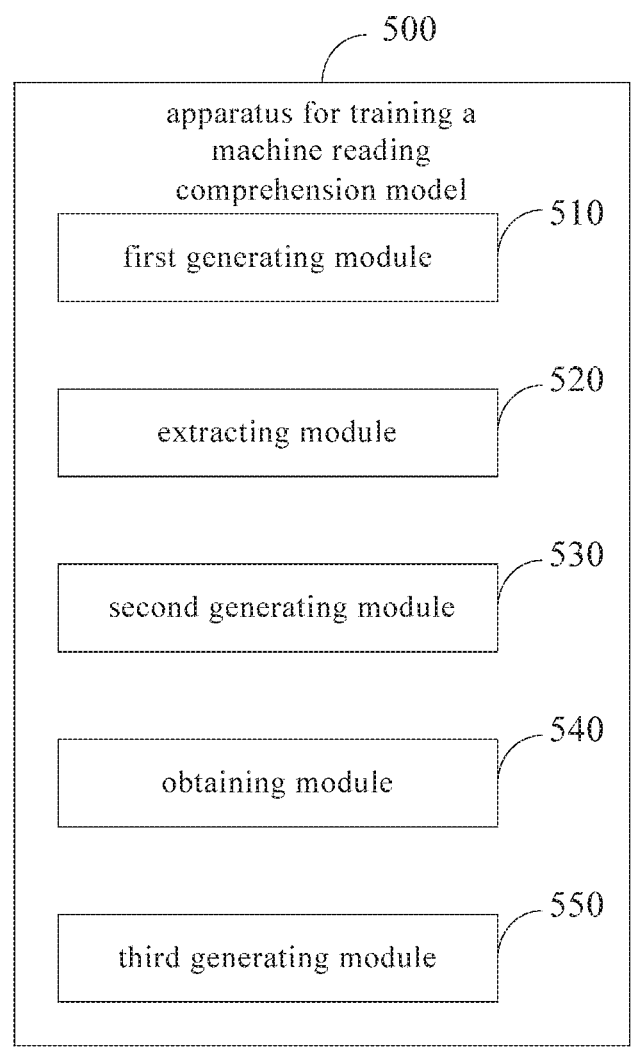
FIG. 6 is a schematic diagram of an apparatus for training a machine reading comprehension model according to an embodiment of the present disclosure.

In order to implement the above embodiments, an apparatus according to an embodiment of the present disclosure is provided. FIG. 6 is a schematic diagram of an apparatus for training a machine reading comprehension model according to an embodiment of the present disclosure.

As illustrated in FIG. 6, the apparatus 500 for training a machine reading comprehension model, includes: a first generating module 510, an extracting module 520, a second generating module 530, an obtaining module 540, and a third generating module 550.

The first generating module 510 is configured to train an initial model to generate an intermediate model based on sample data.

The extracting module 520 is configured to extract samples to be processed from the sample data according to a first preset rule.

The second generating module 530 is configured to generate a noise text according to a preset noise generation method.

The obtaining module 540 is configured to add the noise text to each of the samples to be processed respectively to generate noise samples.

The third generating module 550 is configured to perform correction training on the intermediate model based on the noise samples to generate the machine reading comprehension model.

In a possible implementation, the extracting module 520 is configured to: according to a number N of the sample data, determine a number M of the samples to be processed that are extracted from the sample data, wherein M is less than N; or, randomly select the samples to be processed from the sample data; or, according to labeled answer positions of samples in the sample data, extract the samples to be processed at different labeled answer positions.

In a possible implementation, the second generating module 530 includes: a calculating unit and a first generating unit.

The calculating unit is configured to calculate values of elements in noise vector according to a dictionary corresponding to the intermediate model and a preset weight matrix.

The first generating unit is configured to according to the values of the elements in the noise vector, generate the noise text.

In a possible implementation, the preset weight matrix includes L×K elements, and the calculating unit is configured to determine a value of the $i^{th}$ element in the noise vector according to values of elements in the $i^{th}$ row in the preset weight matrix and vector values of the first K characters in the dictionary corresponding to the intermediate model.

In a possible implementation, the second generating module 530 further includes: a second generating unit, a first determining unit, a second determining unit and an updating unit.

The second generating unit is configured to insert the noise vector into text vectors corresponding to the samples to be processed to generate vectors to be parsed.

The first determining unit is configured to determine labeled answer positions of the vectors to be parsed according to insertion position of the noise vector and initial labeled answer positions of the samples to be processed.

The second determining unit is configured to perform encoding and decoding on the vectors to be parsed by using the intermediate model to determine predicted answer positions of the vectors to be parsed; and The updating unit is configured to if matching degrees between the predicted answer positions and the labeled answer positions of the vectors to be parsed are greater than or equal to a threshold, update the preset weight matrix and regenerating noise vector, until the matching degrees between the determined predicted positions and the labeled positions are less than the threshold after the intermediate model performing the encoding and decoding processes.

In a possible implementation, the apparatus further includes a determining module, configured to according to labeled answer positions $[S_S, S_e]$ of the text vectors corresponding to the samples to be processed, determine that an insertion position $S_t$ of the noise vector is less than or equal to $S_S$-x, or $S_i$ is greater than or equal to $S_e$, wherein $S_S$ is an answer start position, Se is an answer end position, and x is a length of the noise vector.

In a possible implementation, the first generating unit is configured to: obtain the weight vectors corresponding to the elements in the noise vector from the preset weight matrix; and according to a position of the largest weight value of each weight vector, extract a character at the position from a preset dictionary as a character at a corresponding position in the noise text.

In a possible implementation, the first generating unit is configured to select vector values corresponding to characters from the dictionary corresponding to the intermediate model, and determine a character with the highest matching degree with a value of the $j^{th}$ element in the noise vector as the character at the $j^{th}$ position in the noise text.

It is noted that the foregoing explanation of the embodiment of the machine reading comprehension model training method is also applicable for the machine reading comprehension model training apparatus of this embodiment, so details are not described here.

With the apparatus for training the machine reading comprehension model according to embodiments of the present disclosure, an initial model is trained to generate an intermediate model based on sample data. Samples to be processed are extracted from the sample data according to a first preset rule. A noise text is generated according to a preset noise generation method, and added to each of the samples to be processed respectively to generate noise samples. Correction training is performed on the intermediate model based on the noise samples to generate the machine reading comprehension model. Thus, the model is trained by automatically generating the noise text during the training process of the machine reading comprehension model to improve the anti-noise capability of the machine reading comprehension model and the robustness of the model without modifying the model, which requires no manual participation at low cost.

According to the embodiments of the present disclosure, the present disclosure also provides an electronic device and a readable storage medium.

Figure 7:
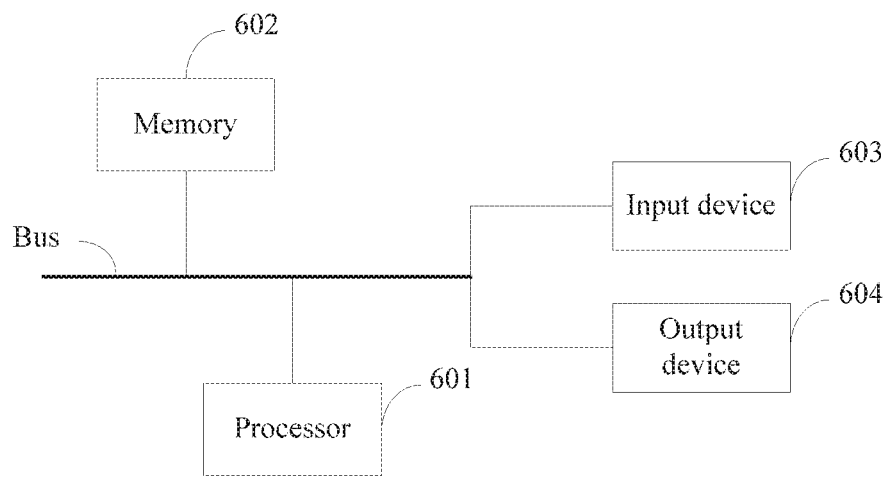
FIG. 7 is a block diagram of an electronic device for implementing the method for training a machine reading comprehension model according to an embodiment of the present disclosure.

FIG. 7 is a block diagram of an electronic device for implementing the method for training a machine reading comprehension model according to an embodiment of the present disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 7, the electronic device includes: one or more processors 601, a memory 602, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 601 is taken as an example in FIG. 7.

The memory 602 is a non-transitory computer-readable storage medium according to the present disclosure. The memory stores instructions executable by at least one processor, so that the at least one processor executes the voice control method according to the present disclosure. The non-transitory computer-readable storage medium of the present disclosure stores computer instructions, which are used to cause a computer to execute the voice control method according to the present disclosure.

As a non-transitory computer-readable storage medium, the memory 602 is configured to store non-transitory software programs, non-transitory computer executable programs and modules, such as program instructions/modules corresponding to the voice skill creation method in the embodiment of the present disclosure (For example, the first generating module 510, the extracting module 520, the second generating module 530, the obtaining module 540, and the third generating module 550 shown in FIG. 6). The processor 601 executes various functional applications and data processing of the server by running non-transitory software programs, instructions, and modules stored in the memory 602, that is, implementing the traffic scheme control method in the foregoing method embodiment.

The memory 602 may include a storage program area and a storage data area, where the storage program area may store an operating system and application programs required for at least one function. The storage data area may store data created according to the use of the electronic device, and the like. In addition, the memory 602 may include a high-speed random access memory, and a non-transitory memory, such as at least one magnetic disk storage device, a flash memory device, or other non-transitory solid-state storage device. In some embodiments, the memory 602 may optionally include a memory remotely disposed with respect to the processor 601, and these remote memories may be connected to the electronic device through a network. Examples of the above network include, but are not limited to, the Internet, an intranet, a local area network, a mobile communication network, and combinations thereof.

The electronic device for implementing the method for training the machine reading comprehension model may further include: an input device 603 and an output device 604. The processor 601, the memory 602, the input device 603, and the output device 604 may be connected through a bus or in other manners. In FIG. 7, the connection through the bus is taken as an example.

The input device 603 may receive inputted numeric or character information, and generate key signal inputs related to user settings and function control of an electronic device, such as a touch screen, a keypad, a mouse, a trackpad, a touchpad, an indication rod, one or more mouse buttons, trackballs, joysticks and other input devices. The output device 604 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (egg, a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other.

This technical solution of the embodiments of the present disclosure trains the model by automatically generating the noise text during the training process of the machine reading comprehension model to improve the anti-noise capability of the machine reading comprehension model and the robustness of the model without modifying the model, which requires no manual participation at low cost.

In addition, terms such as "first" and "second" are used herein for purposes of description and are not intended to indicate or imply relative importance or significance. Furthermore, the feature defined with "first" and "second" may comprise one or more this feature distinctly or implicitly. In the description of the present disclosure, "a plurality of" means two or more than two, unless specified otherwise.

Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A method for training a machine reading comprehension model, comprising:
   training an initial model to generate an intermediate model based on sample data;
   extracting samples to be processed from the sample data according to a first preset rule;
   generating a noise text according to a preset noise generation method;
   adding the noise text to each of the samples to be processed respectively to generate noise samples; and
   performing correction training on the intermediate model based on the noise samples to generate the machine reading comprehension model;
   wherein the generating the noise text according to the preset noise generation method comprises:
   calculating values of elements in a noise vector according to a dictionary corresponding to the intermediate model and a preset weight matrix; and
   according to the values of the elements in the noise vector, generating the noise text;
   wherein the preset weight matrix comprises L×K elements; and
   the calculating the values of the elements in the noise vector according to the dictionary corresponding to the intermediate model and the preset weight matrix, comprises:
   determining a value of the $i^{th}$ element in the noise vector according to values of elements in the $i^{th}$ row in the preset weight matrix and vector values of the first K characters in the dictionary corresponding to the intermediate model;
   after calculating the values of the elements in the noise vector, the method further comprises:
   inserting the noise vector into text vectors corresponding to the samples to be processed to generate vectors to be parsed;
   determining labeled answer positions of the vectors to be parsed according to insertion positions of the noise vector and initial labeled answer positions of the samples to be processed;
   performing encoding and decoding on the vectors to be parsed by using the intermediate model to determine predicted answer positions of the vectors to be parsed; and
   if matching degrees between the predicted answer positions and the labeled answer positions of the vectors to be parsed are greater than or equal to a threshold, updating the preset weight matrix and regenerating the noise vector, until the matching degrees between the determined predicted positions and the labeled positions are less than the threshold after the intermediate model performing the encoding and decoding processes.

2. The method according to claim 1, wherein the extracting the samples to be processed from the sample data according to the preset rule comprises at least of: according to a number N of the sample data, determining a number M of the samples to be processed that are extracted from the sample data, wherein M is less than N; and, randomly selecting the samples to be processed from the sample data; and, according to labeled answer positions of samples in the sample data, extracting the samples to be processed at different labeled answer positions.

3. The method according to claim 1, before inserting the noise vector into the text vectors corresponding to the samples to be processed, further comprising:
according to labeled answer positions [$S_S$, $S_e$] of the text vectors corresponding to the samples to be processed, determining that an insertion position $S_i$, of the noise vector is less than or equal to $S_S$-x, or $S_i$, is greater than or equal to $S_e$, wherein $S_S$ is an answer start position, Se is an answer end position, and x is a length of the noise vector.

4. The method according to claim 1, wherein generating the noise text according to the values of the elements in the noise vector comprises: obtaining the weight vectors corresponding to the elements in the noise vector from the preset weight matrix; and according to a position of the largest weight value of each weight vector, extracting a character at the position from a preset dictionary as a character at a corresponding position in the noise text.

5. The method according to claim 1, wherein the generating the noise text according to the values of the elements in the noise vector comprises: selecting vector values corresponding to characters from the dictionary corresponding to the intermediate model, and determining a character with the highest matching degree with a value of the $j^{th}$ element in the noise vector as the character at the $j^{th}$ position in the noise text.

6. An apparatus for training a machine reading comprehension model, comprising:
one or more processors;
a memory storing instructions executable by the one or more processors;
wherein the one or more processors are configured to:
train an initial model to generate an intermediate model based on sample data;
extract samples to be processed from the sample data according to a first preset rule;
generate a noise text according to a preset noise generation method;
add the noise text to each of the samples to be processed respectively to generate noise samples; and
perform correction training on the intermediate model based on the noise samples to generate the machine reading comprehension model;
wherein the one or more processors are configured to:
calculate values of elements in noise vector according to a dictionary corresponding to the intermediate model and a preset weight matrix; and
according to the values of the elements in the noise vector, generate the noise text;
wherein the preset weight matrix comprises L×K elements, and the one or more processors are configured to:
determine a value of the $i^{th}$ element in the noise vector according to values of the elements in the $i^{th}$ row in the preset weight matrix and vector values of the first K characters in the dictionary corresponding to the intermediate model;
wherein the one or more processors are configured to:
insert the noise vector into text vectors corresponding to the samples to be processed to generate vectors to be parsed;
determine labeled answer positions of the vectors to be parsed according to insertion positions of the noise vector and initial labeled answer positions of the samples to be processed;
perform encoding and decoding on the vectors to be parsed by using the intermediate model to determine predicted answer positions of the vectors to be parsed; and
if matching degrees between the predicted answer positions and the labeled answer positions of the vectors to be parsed are greater than or equal to a threshold, update the preset weight matrix and regenerating the noise vector, until the matching degrees between the determined predicted positions and the labeled positions are less than the threshold after the intermediate model performing the encoding and decoding processes.

7. The apparatus according to claim 6, wherein the one or more processors are configured to extract the samples to be processed from the sample data according to the preset rule by performing at least one of: according to a number N of the sample data, determine a number M of the samples to be processed that are extracted from the sample data, wherein M is less than N; and, randomly select the samples to be processed from the sample data; and, according to labeled answer positions of samples in the sample data, extract the samples to be processed at different labeled answer positions.

8. The apparatus according to claim 6, wherein the one or more processors are configured to:
according to labeled answer positions [$S_S$, $S_e$] of the text vectors corresponding to the samples to be processed, determine that an insertion position $S_i$, of the noise vector is less than or equal to $S_S$-x, or $S_i$, is greater than or equal to $S_e$, wherein $S_S$ is an answer start position, Se is an answer end position, and x is a length of the noise vector.

9. The apparatus according to claim 6, wherein the one or more processors are configured to:
obtain the weight vectors corresponding to the elements in the noise vector from the preset weight matrix; and
according to a position of the largest weight value of each weight vector, extract a character at the position from a preset dictionary as a character at a corresponding position in the noise text.

10. The apparatus according to claim 6, wherein the one or more processors are configured to:
select vector values corresponding to characters from the dictionary corresponding to the intermediate model, and determine a character with the highest matching degree with a value of the $j^{th}$ element in the noise vector as the character at the $j^{th}$ position in the noise text.

11. A non-transitory computer-readable storage medium storing computer instructions, wherein when the computer instructions are executed, the computer is caused to implement a method for training a machine reading comprehension model, and the method comprises:
training an initial model to generate an intermediate model based on sample data;

extracting samples to be processed from the sample data according to a first preset rule;

generating a noise text according to a preset noise generation method;

adding the noise text to each of the samples to be processed respectively to generate noise samples; and performing correction training on the intermediate model based on the noise samples to generate the machine reading comprehension model;

wherein the generating the noise text according to the preset noise generation method comprises:

calculating values of elements in a noise vector according to a dictionary corresponding to the intermediate model and a preset weight matrix; and according to the values of the elements in the noise vector, generating the noise text;

wherein the preset weight matrix comprises L×K elements; and the calculating the values of the elements in the noise vector according to the dictionary corresponding to the intermediate model and the preset weight matrix, comprises:

determining a value of the $i^{th}$ element in the noise vector according to values of elements in the $i^{th}$ row in the preset weight matrix and vector values of the first K characters in the dictionary corresponding to the intermediate model;

after calculating the values of the elements in the noise vector, the method further comprises:

inserting the noise vector into text vectors corresponding to the samples to be processed to generate vectors to be parsed;

determining labeled answer positions of the vectors to be parsed according to insertion positions of the noise vector and initial labeled answer positions of the samples to be processed;

performing encoding and decoding on the vectors to be parsed by using the intermediate model to determine predicted answer positions of the vectors to be parsed; and if matching degrees between the predicted answer positions and the labeled answer positions of the vectors to be parsed are greater than or equal to a threshold, updating the preset weight matrix and regenerating the noise vector, until the matching degrees between the determined predicted positions and the labeled positions are less than the threshold after the intermediate model performing the encoding and decoding processes.

* * * * *